United States Patent [19]
Dodd

[11] Patent Number: 5,833,467
[45] Date of Patent: Nov. 10, 1998

[54] VOR FLIGHT INSTRUCTIONAL AID AND METHOD OF USE

[76] Inventor: Donald K. Dodd, P.O. Box 1498, Springfield, Oreg. 97477

[21] Appl. No.: 884,939

[22] Filed: Jun. 30, 1997

[51] Int. Cl.⁶ .................................................. G09B 19/00
[52] U.S. Cl. ............................ 434/243; 434/239; 33/431
[58] Field of Search ................................... 434/239, 243, 434/29; 33/1 SD, 1 SB, 431, 457

[56] References Cited

U.S. PATENT DOCUMENTS

| | | | |
|---|---|---|---|
| 2,404,386 | 7/1946 | Levine et al. | 434/243 |
| 2,916,825 | 12/1959 | Parsons . | |
| 3,063,626 | 11/1962 | Kritser . | |
| 3,507,969 | 4/1970 | Greenwade | 434/243 |

*Primary Examiner*—Jeffrey A. Smith
*Attorney, Agent, or Firm*—David S. Alavi

[57] ABSTRACT

A VOR flight instructional aid and methods for its use are described herein. Said instructional aid comprises a base, a course indicator arm pivotably connected to said base, and a physical representation of an aircraft connected to the end of the course indicator arm. Said instructional aid may further comprise an OBS/CDI indicator disk pivotably connected to the base for illustrating the approximate appearance of a CDI display resulting from various combinations of aircraft position and OBS setting. Said instructional aid may be used by: 1) placing the base on a flight navigation chart; 2) substantially aligning the pivot point of the course indicator arm above the position of the desired VOR station on the chart; and 3) rotating the course indicator arm to an OBS-selected radial, thereby physically representing the aircraft position relative to the VOR station. Further steps may include rotating the OBS/CDI indicator disk to an OBS-selected radial, and noting the resulting approximate CDI needle appearance physically and graphically represented by the position of the course indicator arm relative to the OBS/CDI indicator disk.

13 Claims, 5 Drawing Sheets

VOR FLIGHT INSTRUCTIONAL AID AND METHOD OF USE

FIELD OF THE INVENTION

The field of the present invention relates to flight instructional aids. In particular, a VOR flight instructional aid is described herein for facilitating training of student pilots in the use of the very-high-frequency omni-directional radio range (VOR) system for instrument based aircraft navigation.

BACKGROUND

In the United States, most instrument-based aircraft navigation is done with the aid of a nationwide system of VOR stations and VOR receivers in aircraft. Each ground based VOR station emits very-high-frequency (VHF) radio signals at a frequency between 108.0 and 118.0 MHz. Each station broadcasts a three letter station identifier in Morse code, as well as the VOR signal itself. The VOR signal has two parts, known as the reference phase signal and the variable phase signal. It is transmitted in such a way that the electrical phase angle between the two components differs by the exact number of degrees that the receiving aircraft's radial (a line extending from the station through the aircraft's position) is away from the station's 360° radial (a line extending from the station toward magnetic north). The VOR receiver recognizes the phase difference and uses it to determine the aircraft's magnetic direction, or course, relative to the VOR station. The radials, or courses, from a VOR station are typically designated by numbers corresponding to the number of degrees from magnetic north divided by ten. Therefore, 0 is north, 9 is east, 18 is south, 27 west, and so on.

FIG. 1 illustrates a typical cockpit VOR display 100, comprising an OBS (omni-bearing selector) and a CDI (course direction indicator). The OBS allows a pilot/navigator to select a particular radial from the VOR station broadcasting at the frequency to which the VOR receiver has been tuned. The OBS dial 104 appears as a ring with markings and numbers corresponding to each radial. By adjusting an OBS knob 102, the ring is rotated until the number of the desired radial is positioned at the top center of VOR display 100. CDI 106 typically comprises a round face with an indicator needle 108 pivoted about its top end 109 and a "TO/FROM" indicator 110. A centered needle indicates that the aircraft's course, or position, lies along the OBS-selected radial (if "FROM" is indicated), or 180° from the OBS-selected radial (if "TO" is indicated). With the CDI needle thus centered, if the pilot matches the aircraft heading to the selected radial with "FROM" indicated, the aircraft would fly away from the station along the OBS-selected radial. If the pilot matches the aircraft heading to the selected radial with "TO" indicated, the aircraft would fly toward the station along the radial 180° from the OBS-selected radial. If the pilot matches the aircraft heading to the radial 180° from the selected radial with "FROM" indicated, the aircraft would fly toward the station along the OBS-selected radial. If the pilot matches the aircraft heading to the radial 180° from the selected radial with "TO" indicated, the aircraft would fly away from the station along the radial 180° from the OBS-selected radial.

If the CDI needle is deflected to either side, the side to which the needle is deflected along with the TO/FROM indicator are used to determine the aircraft's position relative to the selected radial, as well as the direction the aircraft must travel to intercept the desired radial. The correct interpretation of a VOR display can be quite complicated, as demonstrated by even the simple scenarios described in the preceding paragraph. A great deal of confusion arises in the interpretation of readings from the VOR. Misinterpretation of VOR readings leads to numerous potentially disastrous navigation errors, and a great deal of time and effort are expended during flight training to try to insure that pilots properly interpret VOR displays while navigating an aircraft. Much of this training takes place in the classroom, and it has proven quite difficult to convey in a classroom setting the geometrical relationships between aircraft, VOR station, and radials as indicated by a VOR display. It is therefore highly desirable to develop flight instructional aids that effectively develop a pilot's ability to correctly interpret VOR signals, particularly in classroom instructional settings.

SUMMARY OF THE INVENTION

Certain aspects of the present invention may advance the state-of-the-art of flight instructional aids, and in addition may meet one or more of the following objects:

To provide a VOR flight instructional aid and methods of use which provide a physical representation of aircraft position relative to a VOR station;

To provide a VOR flight instructional aid and methods of use which provide physical and graphical representations of the readings obtained from a VOR display;

To provide a VOR flight instructional aid and methods of use which clearly illustrate the variation of VOR readings as the position of the aircraft changes relative to the VOR station while the OBS setting remains fixed; and To provide a VOR flight instructional aid and methods of use which clearly illustrate the variation of VOR readings as the OBS setting is changed for a given aircraft position relative to the VOR station.

One or more of said objects may be achieved in the present invention by a VOR flight instructional aid comprising a base, a course indicator arm pivotably connected to said base, and a physical representation of an aircraft connected to the end of the course indicator arm. The base may be constructed so that when placed on a chart showing a VOR station and the radials around the VOR station, the chart may be read and the pivot point of the course indicator arm may be substantially aligned over the VOR station location on the chart. The aircraft representation may comprise a miniature model of an airplane pivotably connected to the course indicator arm for representing both the course and heading of the aircraft. The instructional aid may further comprise an OBS/CDI indicator disk pivotably connected to the base for illustrating the approximate appearance of a CDI display resulting from various combinations of aircraft position and OBS setting.

One or more of said objects may be achieved in the present invention by a method of use of the instructional aid described above, comprising the steps of: 1) placing the base on a flight navigation chart; 2) substantially aligning the pivot point of the course indicator arm above the position of the desired VOR station on the chart; and 3) rotating the course indicator arm to an OBS-selected radial, thereby physically representing the aircraft position relative to the VOR station when the CDI needle is centered and "FROM" is indicated. Alternatively, step 3) may comprise rotating the course indicator arm to 180° from an OBS-selected radial, thereby physically representing the aircraft position relative to the VOR station when the CDI needle is centered and "TO" is indicated. Further steps may include rotating the OBS/CDI indicator disk to a selected radial, and noting the resulting approximate CDI needle appearance physically and graphically represented by the position of the course indicator arm relative to the OBS/CDI indicator disk. The OBS/CDI indicator may be rotated while holding the course indicator arm stationary, thereby illustrating the changing approximate appearance of a CDI display when the OBS setting is changed at a given aircraft position. Alternatively, the course indicator arm may be rotated while holding the OBS/CDI indicator disk stationary, thereby illustrating the changing approximate appearance of the CDI display when the aircraft moves relative to the VOR station radials for a given OBS setting.

Additional objects and advantages of the present invention may become apparent upon referring to the preferred and alternative embodiments of the present invention as illustrated in the drawings and described in the following written description and/or claims.

DETAILED DESCRIPTION OF PREFERRED AND ALTERNATIVE EMBODIMENTS

Figure 1:
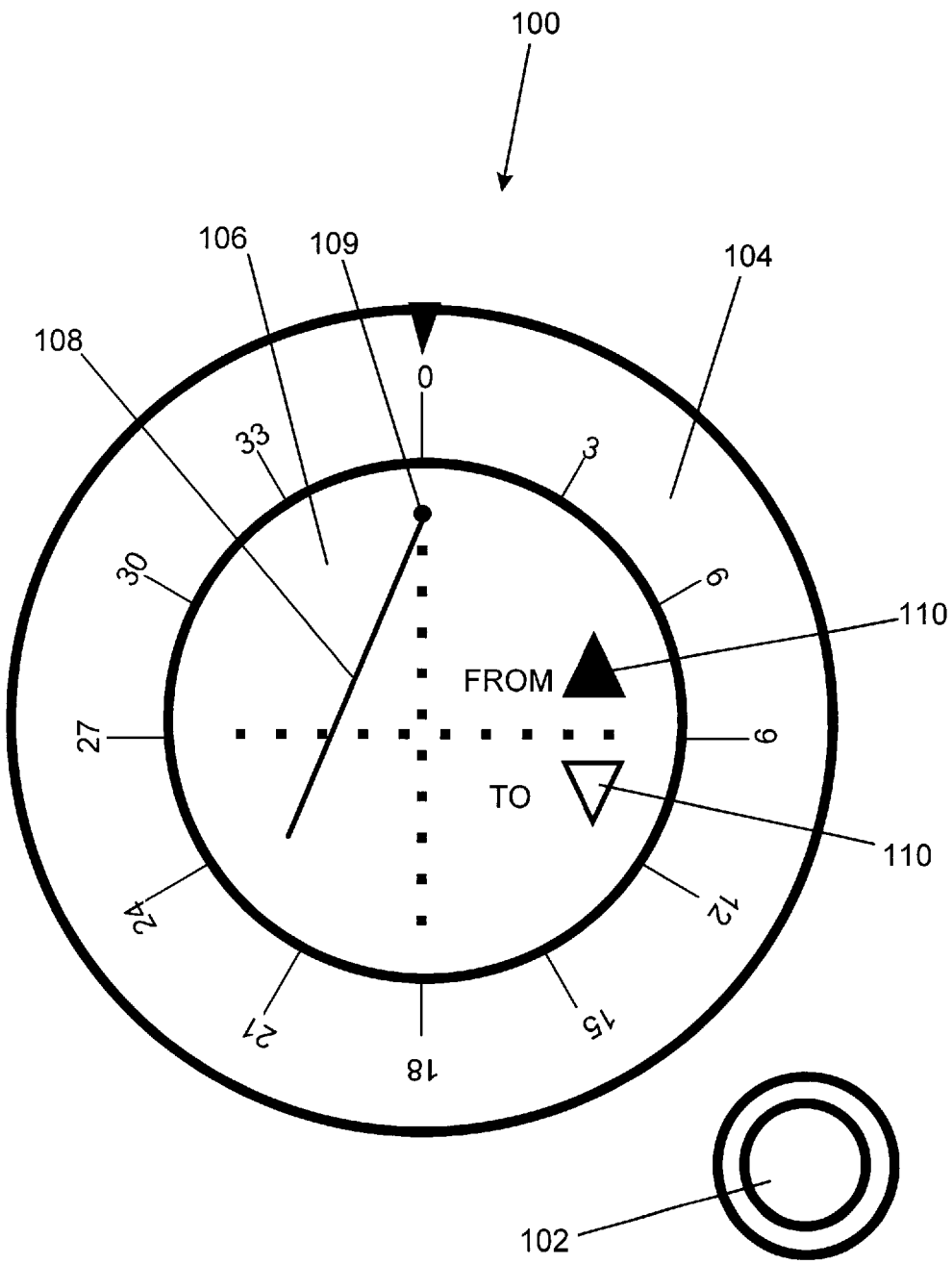
FIG. 1 shows the typical appearance of a cockpit VOR indicator according to the prior art.
Figure 2:
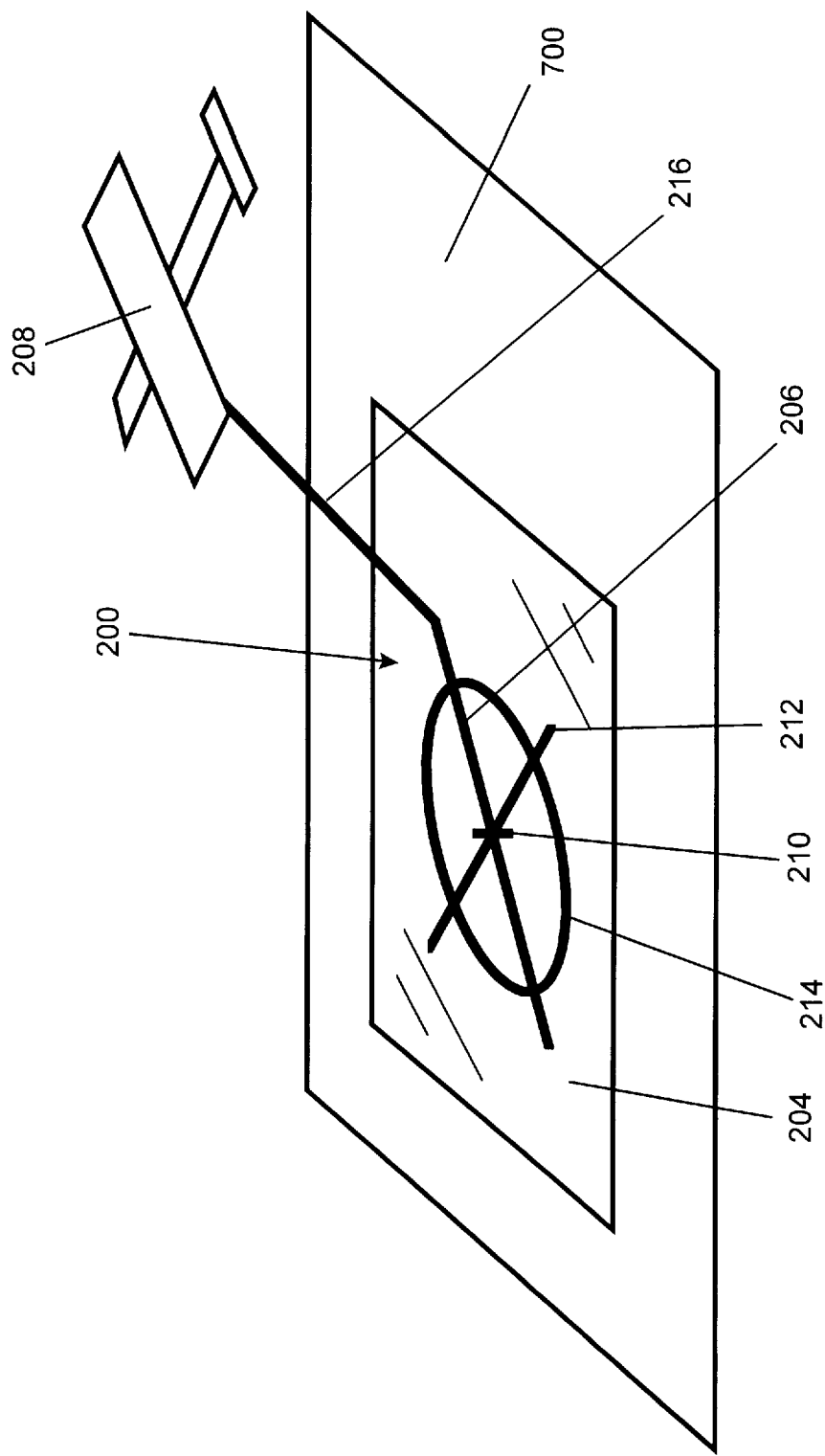
FIG. 2 is a perspective view of a VOR flight instructional aid resting on a chart according to the present invention.

Referring to FIG. 2, a preferred embodiment of VOR instructional aid 200 according to the present invention is shown resting on flight navigation chart 700. Base 204 may comprise a substantially transparent plate for supporting VOR instructional aid 200 while allowing chart 700 to be read through base 204. Course indicator arm 206 may be connected to and supported by base 204 by pivot 210. Course indicator arm 206 may rotate about a substantially vertical rotation axis defined by pivot 210. Course indicator arm 206 may be provided at one end with an elongated inclined arm 216, which extends from course indicator arm 206 radially outward and upward. A miniature model 208 of an aircraft may be pivotably connected to inclined arm 216, thereby serving as a physical representation of an aircraft and the aircraft course, or position, relative to a VOR station shown on chart 700. An auxiliary arm 212 may be rigidly connected substantially perpendicularly to course indicator arm 206 at pivot 210. A ring 214 may be secured to course indicator arm 206 and/or auxiliary arm 212, thereby dividing ring 214 into four substantially equal quadrants.

Figure 3:
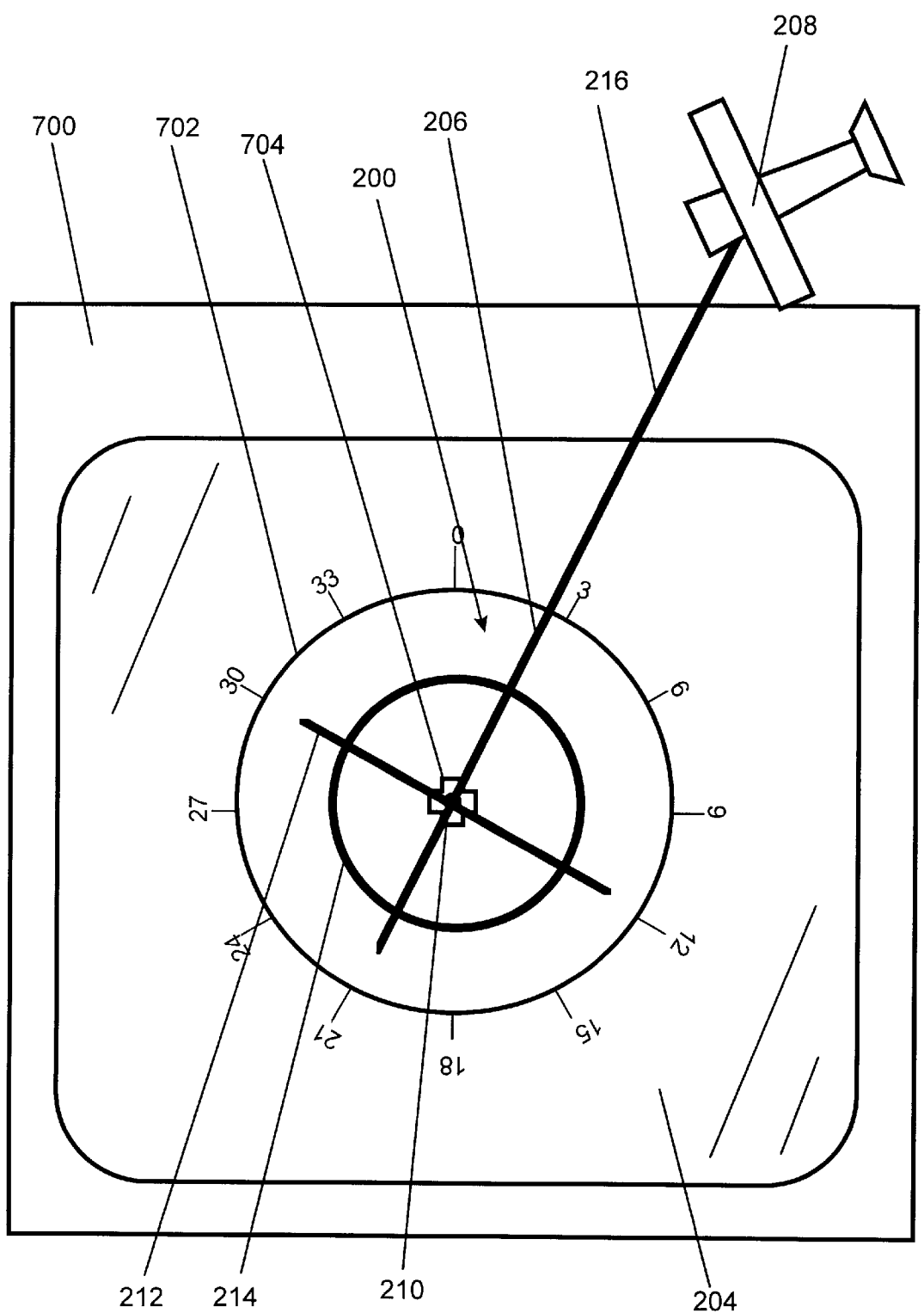
FIG. 3 is a top view of a VOR flight instructional aid resting on a chart according to the present invention.

A preferred method of use of the VOR instructional aid 200 is illustrated in FIG. 3. VOR station compass rose 702 (i.e., the circle on a chart showing all of the radials emanating from a VOR station location) on chart 700 is shown for a VOR station whose location is indicated by VOR station marker 704 on chart 700. Instructional aid 200 may be placed on chart 700 with pivot 210 substantially aligned over VOR marker 704. Course indicator arm 206 may be rotated about pivot 210 until it lies above the number on compass rose 702 which if selected by the OBS would result in the CDI needle being centered with a "FROM" indication, thereby providing a physical representation of the aircraft course relative to the VOR station. If the CDI were to show a "TO" indication and a centered needle, the course indicator arm 206 would be positioned over the number on compass rose 702 that is 180° from the OBS setting to provide a physical representation of the aircraft course relative to the VOR station. Thus, a physical representation of the position (equivalently, course or radial) of an aircraft relative to the VOR station may be produced for the case of a centered CDI needle and either a "FROM" or "TO" indication. Note that the VOR yields no information regarding the heading (direction of travel) of the aircraft. However, instructional aid 200 may be used to physically represent both course (position) and heading (direction) of an aircraft, since the miniature aircraft model 208 may be pivoted to represent the heading of the aircraft.

Figure 4:
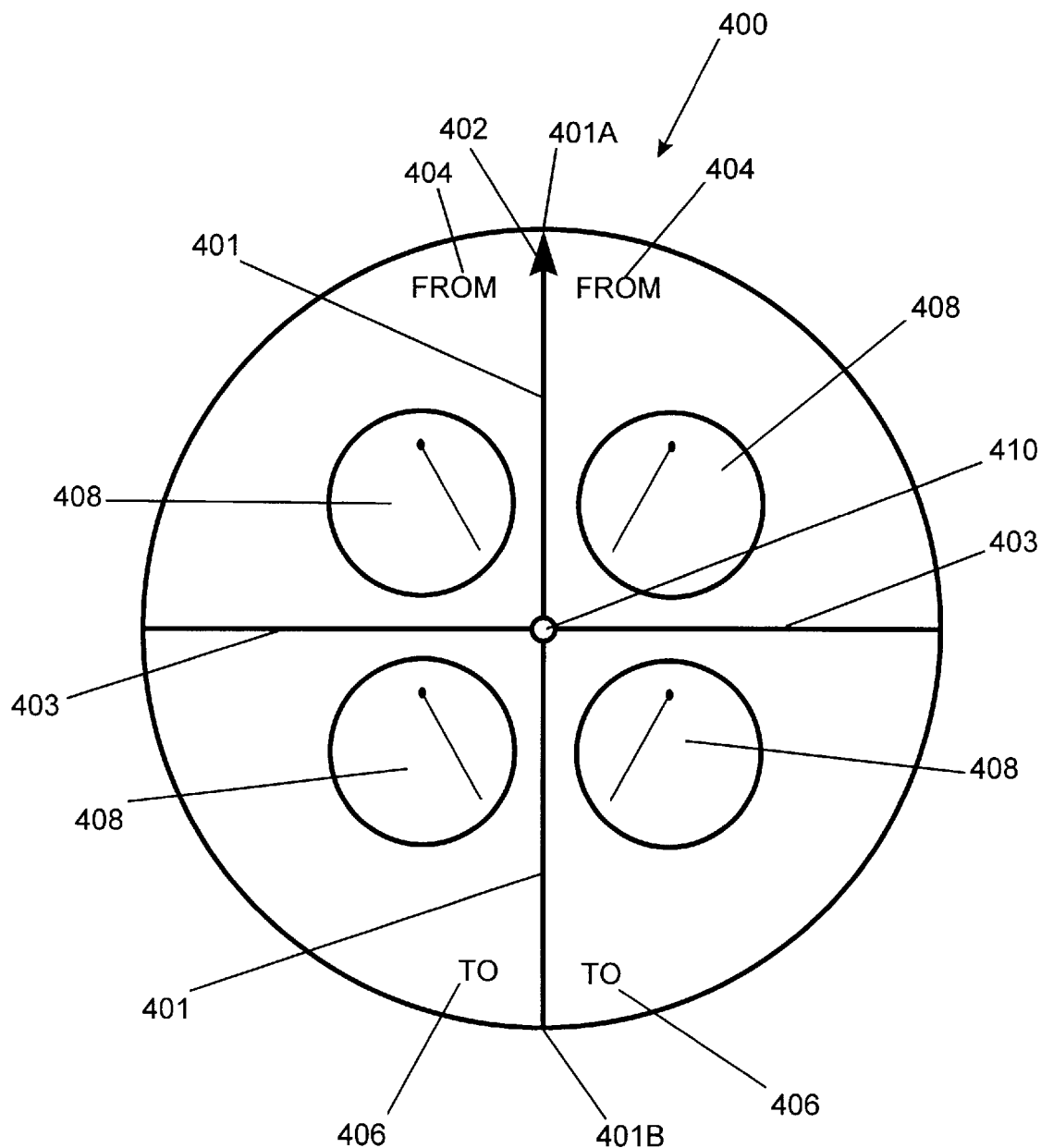
FIG. 4 is a top view of an OBS/CDI disk for a VOR flight instructional aid according to the present invention.

FIG. 4 shows a preferred embodiment of an OBS/CDI disk 400 according to the present invention. This component may be used as part of a preferred embodiment of instructional aid 200. OBS/CDI disk 400 may be removed from instructional aid 200 for use as described hereinabove, and may be replaced for use as described hereinbelow. A preferred embodiment of OBS/CDI disk may comprise a disk of substantially transparent material with a hole 410 at the center of the disk, thereby allowing disk 400 to be rotatably connected to pivot 210. Disk 400 carries lines 401 and 403 on its top surface dividing the top surface into four substantially equal quadrants and further comprising: an arrow indicator 402 at end 401A of line 401, the word "FROM" 404 in each of the two quadrants bordering end 401A of line 401, the word "TO" 406 in each of the two quadrants bordering end 401B of line 401, and a graphical representation 408 of a CDI indicator in each of the four quadrants illlustrating the approximate appearance of the CDI needle for various combinations of aircraft position and OBS setting.

Figure 5:
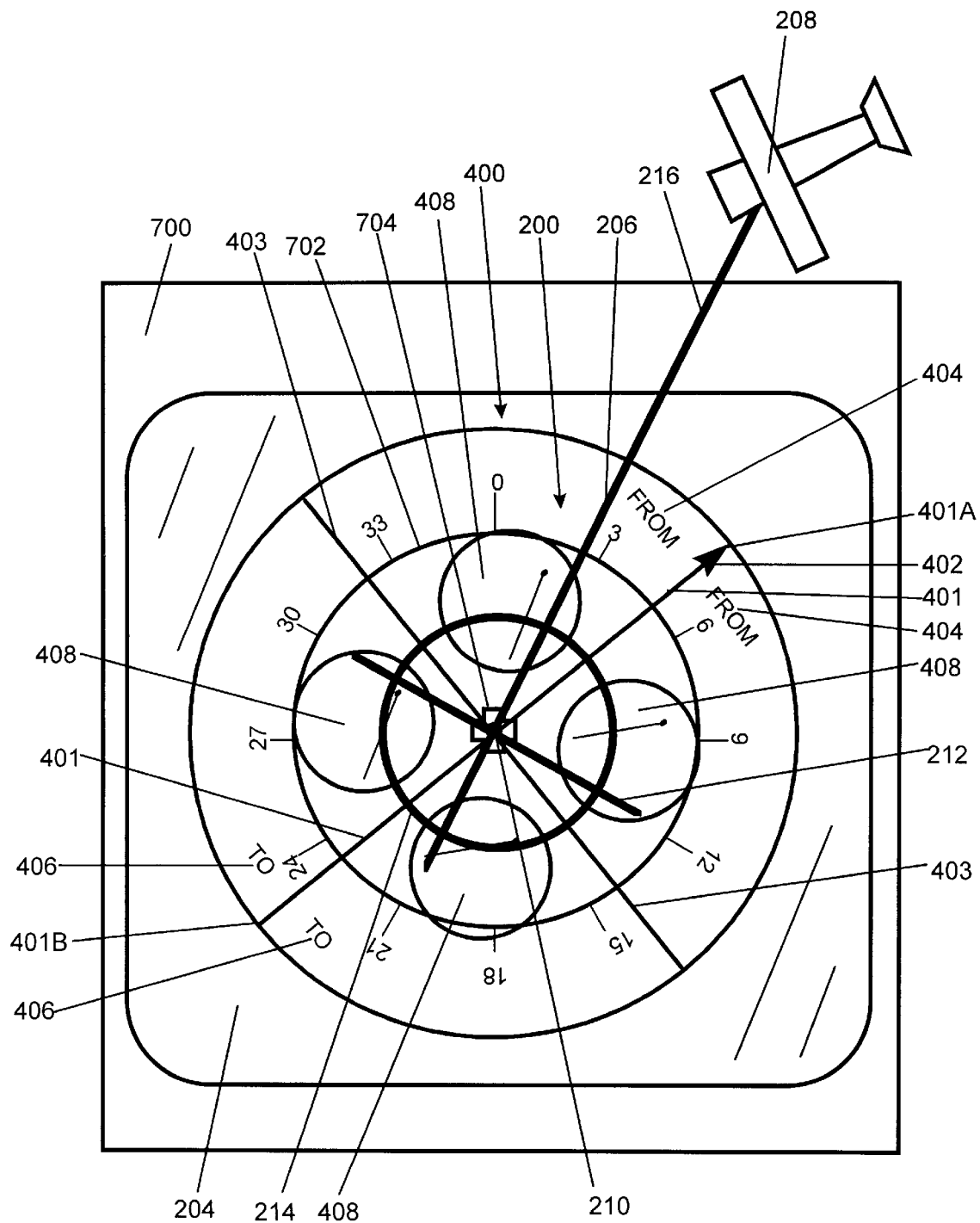
FIG. 5 is a top view of a VOR flight instructional aid with an OBS/CDI disk resting on a chart according to the present invention.

A preferred method of use of the VOR instructional aid 200 with OBS/CDI disk 400 is illustrated in FIG. 5. VOR station compass rose 702 on chart 700 is shown for a VOR station, along with VOR station marker 704 on chart 700. Instructional aid 200 with OBS/CDI disk 400 may be placed on chart 700 with pivot 210 substantially aligned over VOR marker 704. Course indicator arm 206 may be rotated about pivot 210 to any desired radial from the VOR station marker 704. OBS/CDI disk 400 may be rotated about pivot 210. Arrow 402 represents an OBS setting as indicated on compass rose 702. If course indicator arm 206 lies over line 401, then the CDI indicator needle would appear centered, with a "FROM" indication if course indicator arm 206 lies above end 401A and arrow 402, or with a "TO" indication if course indicator arm 206 lies above end 401B. If course indicator arm lies over line 403, then the CDI indicator needle would be fully deflected to one side or the other according to which side of disk 400 is beneath course indicator arm 206. Neither "FROM" nor "TO" would be displayed by a CDI in this case. This is the so-called "zone of ambiguity". If course indicator arm 206 lies above one of the four quadrants of OBS/CDI disk 400, a CDI indicator needle and FROM/TO indicator would appear as shown by either markings 404 or 406 and marking 408 on that quadrant. Thus the flight instructional aid 200 with OBS/CDI disk 400 may graphically represent the approximate appearance of the VOR display for various combinations of aircraft course and OBS setting, as well as produce a physical representation of the position (equivalently, course or radial) of an aircraft relative to a VOR station. Note that, as described hereinabove, the VOR yields no information regarding the heading (direction of travel) of the aircraft. However, flight instructional aid 200 may be used to physically represent both course (position) and heading (direction) of the aircraft.

In an alternative embodiment of the present invention, base 204 may comprise any structure suitable for pivotably supporting course indicator arm 206 while allowing chart 700 to be read and instructional aid 200 to be substantially aligned over VOR station marker 704. Such structures may include but are not limited to: a substantially transparent and/or translucent plate; a tripod; a grid structure; a plurality of legs; functional equivalents thereof; and/or combinations thereof.

In an alternative embodiment of the present invention, course indicator arm 206, alone or in conjunction with extended portion 216, may assume any shape or path that displaces the representation of the aircraft radially from pivot 210, including but not limited to: a substantially horizontal central portion with a radially extending and upwardly inclined straight portion; a substantially horizontal central portion with a radially and upwardly extending curved portion; a substantially horizontal arm; functional equivalents thereof; and/or combinations thereof.

In an alternative embodiment of the present invention, the physical representation 208 of an aircraft may assume any form, including but not limited to: a polygon; a circle; an ellipse; an arrow; an arrowhead; other geometric figures; a miniature model of an airplane or other aircraft; functional equivalents thereof; and/or combinations thereof. The physical representation 208 may represent the heading of the aircraft if the chosen representation is sufficiently asymmetric to indicate a direction and if the representation is pivotably connected to the course indicator arm.

In an alternative embodiment of the present invention, auxiliary arm 212 and ring 214 may be eliminated. Only course indicator arm 206 is required for proper operation of flight instructional aid 200, with or without OBS/CDI disk 400.

In an alternative embodiment of the present invention, the OBS/CDI disk 400 may comprise any structure pivotably connected to the base which carries markings enabling indication of a selected OBS setting, and illustrating the approximate appearance of the CDI needle for various combinations of aircraft course and OBS setting. In particular, OBS/CDI disk need not be circular, but may assume any suitable shape, including but not limited to diamond, square, other polygons, oval, ellipse, functional equivalents thereof, and/or combinations thereof. The OBS/CDI disk also need not be transparent, so long as the chart, compass rose, and VOR station marker may be seen below it. This may be accomplished by means including, but not limited to: a small OBS/CDI disk (for example, smaller than compass rose 702), a transparent or translucent OBS/CDI disk, an OBS/CDI disk with cut-out portions, functional equivalents thereof, and/or combinations thereof. Various portions of the OBS/CDI disk may be different colors to further enhance the clarity of the resulting physical and/or graphical representation of the approximate appearance of the CDI needle for various combinations of aircraft course and OBS setting.

The present invention has been set forth in the form of its preferred embodiments. It is nevertheless intended that modifications to the disclosed VOR flight instructional aids and methods of use may be made without departing from inventive concepts disclosed and/or claimed herein.

What is claimed is:

1. A VOR flight instructional aid, comprising:
   means for supporting said instructional aid on a chart and for viewing the chart therethrough;
   a course indicator arm having a first end, a second end, and a pivot point between the first end and the second end, said course indicator arm being pivotably secured to and supported by said supporting and viewing means at the pivot point and rotatable about a substantially vertical axis through the pivot point; and
   a physical representation of an aircraft connected to the first end of said course indicator arm, thereby enabling a user to physically represent a course for the aircraft.

2. A VOR flight instructional aid as recited in claim 1, wherein said supporting and viewing means comprises a substantially transparent flat plate.

3. A VOR flight instructional aid as recited in claim 1, further comprising an auxiliary indicator arm substantially rigidly connected to said course indicator arm at the pivot point, wherein said auxiliary arm is positioned substantially perpendicular to said course indicator arm and said auxiliary arm rotates about the rotation axis with said course indicator arm.

4. A flight instructional aid as recited in claim 3, further comprising a substantially circular ring substantially concentric with the rotation axis and secured to at least one of said course indicator arm and said auxiliary arm, thereby dividing the ring into four substantially equal quadrants.

5. A VOR flight instructional aid as recited in claim 1, wherein said aircraft representation is connected to the first end of said course indicator arm by an elongated inclined arm, said inclined arm sloping from the first end of the course indicator arm radially outward and upward.

6. A VOR flight instructional aid as recited in claim 1, wherein said aircraft representation is pivotably connected to the first end of said course indicator arm and comprises a heading indicator, thereby allowing the user to physically represent a heading of the aircraft.

7. A VOR flight instructional aid as recited in claim 6, wherein said heading indicator comprises a miniature model of the aircraft.

8. A VOR flight instructional aid as recited in claim 1, further comprising means for indicating an OBS-selected radial on a chart and means for graphically representing an approximate appearance of a CDI needle for various combinations of aircraft course and an OBS setting.

9. A VOR flight instructional aid as recited in claim 8, wherein said indicating means and said graphical representing means comprise an OBS/CDI disk, said OBS/CDI disk comprising a flattened substantially circular disk having a center, a circumference, a top surface, and a bottom surface, wherein said disk is substantially transparent, said disk is pivotably secured to and supported by said supporting and viewing means, said disk may rotate about the vertical rotation axis relative to said supporting and viewing means and relative to said course indicator arm, said disk has lines on the top surface dividing the top surface into first, second, third, and fourth substantially equal quadrants disposed in a clockwise progression around said disk, and said disk has markings comprising: an arrow indicator pointing radially outward between the first and second quadrants, the word "FROM" in each of the first and second quadrants, the word "TO" in each of the third and fourth quadrants, a graphical representation of a CDI needle displaced to the right in each of the first and fourth quadrants, and a graphical representation of a CDI needle displaced to the left in each of the second and third quadrants.

10. A VOR flight instructional aid as recited in claim 9, further comprising:

an auxiliary indicator arm substantially rigidly connected to said course indicator arm at the pivot point, wherein said auxiliary arm is positioned substantially perpendicular to said course indicator arm and said auxiliary arm rotates about the rotation axis with said course indicator arm; and a substantially circular ring substantially concentric with the rotation axis and secured to at least one of said course indicator arm and said auxiliary arm, thereby dividing the ring into four substantially equal quadrants, wherein:

said supporting and viewing means comprises a substantially transparent flat plate;

said aircraft representation is connected to the first end of said course indicator arm by an elongated inclined arm, said inclined arm sloping from the first end of the course indicator arm radially outward and upward; and said aircraft representation is pivotably connected to the first end of said course indicator arm and comprises a miniature model of the aircraft, thereby allowing the user to physically represent a heading of the aircraft.

11. A method for providing VOR flight instruction using the VOR flight instructional aid as recited in claim 9, comprising the steps of:

A) placing said VOR instructional aid on a chart with the pivot substantially aligned above a VOR station marker on the chart;

B) rotating said course indicator arm to a position above a first radial from the VOR station marker on the chart;

C) rotating said OBS/CDI disk and positioning the arrow indicator above an OBS-selected radial from the VOR station marker on the chart;

D) noting the position of said representation of the aircraft relative to the VOR station marker on the chart; and E) noting which of the markings of said OBS/CDI disk appear beneath said course indicator arm, thereby illustrating an approximate appearance of the CDI needle.

12. A method for providing VOR flight instruction using the VOR flight instructional aid as recited in claim 8, comprising the steps of:

A) placing said VOR instructional aid on a chart with the pivot substantially aligned above a VOR station marker on the chart;

B) rotating said course indicator arm to a position above a first radial from the VOR station marker on the chart;

C) rotating said indicating means to a position above an OBS-selected radial from the VOR station marker on the chart;

D) noting the position of said representation of the aircraft relative to the VOR station marker on the chart; and E) noting the approximate appearance of the CDI needle represented by said graphically representing means.

13. A method for providing VOR flight instruction using the VOR flight instructional aid as recited in claim 1, comprising the steps of:

A) placing said VOR flight instructional aid on a chart with the pivot substantially aligned above a VOR station marker on the chart;

B) rotating said course indicator arm to a position above an OBS-selected radial from the VOR station marker on the chart; and C) noting the position of said representation of the aircraft relative to the VOR station marker on the chart.

* * * * *